(12) United States Patent
Kagimoto et al.

(10) Patent No.: US 12,117,232 B2
(45) Date of Patent: Oct. 15, 2024

(54) ISOTHERMAL CONTAINER

(71) Applicant: Panasonic Intellectual Property Management Co., Ltd., Osaka (JP)

(72) Inventors: Masahiro Kagimoto, Shiga (JP); Shinya Kojima, Kyoto (JP); Hideji Kawarazaki, Osaka (JP); Tomoaki Kitano, Nara (JP); Masafumi Okawa, Osaka (JP); Toshiaki Hirano, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 317 days.

(21) Appl. No.: 17/620,594

(22) PCT Filed: Jun. 12, 2020

(86) PCT No.: PCT/JP2020/023258
§ 371 (c)(1),
(2) Date: Dec. 17, 2021

(87) PCT Pub. No.: WO2020/255888
PCT Pub. Date: Dec. 24, 2020

(65) Prior Publication Data
US 2022/0357098 A1 Nov. 10, 2022

(30) Foreign Application Priority Data
Jun. 17, 2019 (JP) .................... 2019-112245

(51) Int. Cl.
F25D 23/06 (2006.01)
(52) U.S. Cl.
CPC ......... *F25D 23/065* (2013.01); *F25D 23/062* (2013.01); *F25D 2201/12* (2013.01); *F25D 2201/14* (2013.01)

(58) Field of Classification Search
CPC ................ F25D 23/065; F25D 23/062; F25D 2201/12; F25D 2201/14; F25D 2303/0844
See application file for complete search history.

(56) References Cited

U.S. PATENT DOCUMENTS

| | | | | |
|---|---|---|---|---|
| 2005/0235682 A1* | 10/2005 | Hirai | ............. | F25D 23/062 312/401 |
| 2009/0078708 A1* | 3/2009 | Williams | ............. | B65D 81/3825 220/592.2 |
| 2011/0290792 A1* | 12/2011 | Krzak | ............. | F25D 3/08 220/1.5 |

(Continued)

FOREIGN PATENT DOCUMENTS

| | | |
|---|---|---|
| CN | 106494760 A | 3/2017 |
| JP | S60031289 U | 3/1985 |

(Continued)

OTHER PUBLICATIONS

Japanese Office Action issued in corresponding Japanese Patent Application No. 2021-528188, dated Jun. 28, 2022, with English translation.
Extended European Search Report issued in corresponding European Patent Application No. 20827415.9, dated Jul. 19, 2022.

(Continued)

*Primary Examiner* — David J Teitelbaum
(74) *Attorney, Agent, or Firm* — Rimon P.C.

(57) ABSTRACT

An isothermal container includes: a vacuum heat insulating container; a vacuum heat insulating lid configured to close the vacuum heat insulating container; a body protection case, and a lid outer protection case and lid inner protection case that cover outside of the vacuum heat insulating container and outside of the vacuum heat insulating lid, respectively; a box body housed inside the vacuum heat insulating container; a box lid configured to close the box body; and a cold storage agent provided on a bottom portion and a wall portion of the box body and the box lid. Outer and inner cover materials are joined together at faces facing the (Continued)

vacuum heat insulating lid among faces constituting the wall portion of the vacuum heat insulating container. A joined part of the materials is located inside the body protection case without being exposed to the outer surface of the body protection case.

11 Claims, 6 Drawing Sheets

(56) References Cited

U.S. PATENT DOCUMENTS

| | | | | |
|---|---|---|---|---|
| 2014/0054297 | A1* | 2/2014 | Patstone | F25D 11/003 220/592.01 |
| 2018/0162626 | A1* | 6/2018 | Munie | A45C 13/26 |
| 2018/0335241 | A1* | 11/2018 | Li | B65D 25/06 |

FOREIGN PATENT DOCUMENTS

| | | |
|---|---|---|
| JP | H11223440 A | 8/1999 |
| JP | 2007238141 A | 9/2007 |
| JP | 2008030790 A | 2/2008 |
| JP | 2013010524 A | 1/2013 |
| JP | 2015-205697 A | 11/2015 |
| JP | 2017052522 A | 3/2017 |
| JP | 2017172825 A | 9/2017 |
| WO | 2013002325 A1 | 1/2013 |
| WO | 2017033731 A1 | 3/2017 |

OTHER PUBLICATIONS

International Search Report and Written Opinion issued in corresponding International Patent Application No. PCT/JP2020/023258, dated Aug. 18, 2020, with English translation.

Extended European Search Report received in corresponding European Patent Application No. 23198647.2, dated Feb. 9, 2024.

* cited by examiner

ISOTHERMAL CONTAINER

CROSS-REFERENCE TO RELATED APPLICATIONS

This application is the U.S. National Phase under 35 U.S.C. § 371 of International Application No. PCT/JP2020/023258, filed on Jun. 12, 2020, which claims the benefit of Japanese Application No. 2019-112245, filed on Jun. 17, 2019, the entire contents of each are hereby incorporated by reference.

TECHNICAL FIELD

The present invention relates to an isothermal container.

BACKGROUND ART

There is known a conventional isothermal container that has a heat insulating property, and manages and stores a stored item within a predetermine temperature range.

As such an isothermal container, for example, a technique including an exterior case, an interior case, and an inner box, the inner box being made of a non-permeable member, the inner box having a shape extending along a bottom face and a side face of the interior case, the inner box including a bent non-permeable member located on an edge portion facing a boundary, is disclosed (e.g., refer to Patent Literature 1).

CITATION LIST

Patent Literature

[Patent Literature 1]
Internal Publication No. WO2017/033731

SUMMARY OF INVENTION

Technical Problem

However, in the conventional technique, cool air of a cold storage agent may directly leak out of the cases due to the inner box serving as a heat bridge.

An object of the present invention, which has been made in view of the above point, is to provide an isothermal container capable of preventing heat leakage and maintaining a stored item at a predetermined temperature for a long time.

Solution to Problem

In order to achieve the above object, an isothermal container according to an aspect of the present invention includes: a heat insulating container having a bottom portion and a wall portion continuous with a peripheral edge of the bottom portion, the heat insulating container including a core material, an adsorbent, and two cover materials facing each other, the two cover materials covering the core material and the adsorbent; a heat insulating lid configured to close the heat insulating container; a protection case that covers outside of the heat insulating container and outside of the heat insulating lid; a box body housed inside the heat insulating container; a box lid configured to close the box body; and a phase change material provided on a bottom portion and a wall portion of the box body and the box lid. The cover materials are joined together at faces facing the heat insulating lid among faces constituting the wall portion of the heat insulating container. A joined part of the cover materials is located inside the protection case without being exposed to an outer surface of the protection case.

Accordingly, since the joined part of the cover materials is located inside the protection case without being exposed to the outer surface of the protection case, the heat insulating container does not make direct contact with outside air. Thus, it is possible to prevent heat from leaking through the surface of the heat insulating container.

Note that the entire contents of Japanese Patent Application No. 2019-112245 filed on Jun. 17, 2019 are incorporated in this specification.

Advantageous Effects of Invention

According to the aspect of the present invention, since the joined part of the cover materials is located inside the protection case without being exposed to the outer surface of the protection case, the heat insulating container does not make direct contact with outside air. Thus, it is possible to prevent heat from leaking through the surface of the heat insulating container and maintain a stored item at a predetermined temperature for a long time.

DESCRIPTION OF EMBODIMENTS

Figure 1:
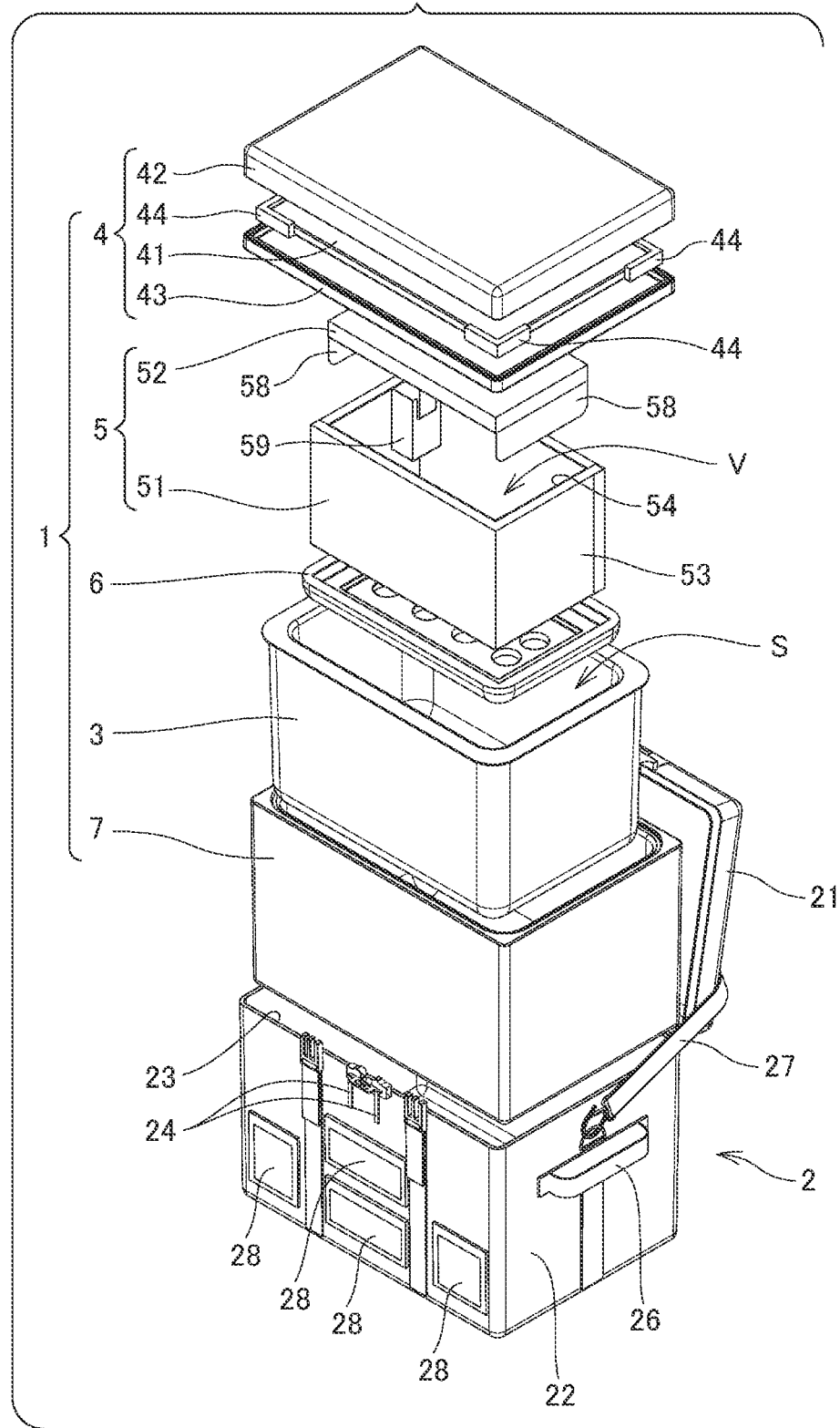
FIG. 1 is an exploded perspective view of an isothermal container according to an embodiment of the present invention.

According to a first aspect of the invention, an isothermal container includes: a heat insulating container having a bottom portion and a wall portion continuous with a peripheral edge of the bottom portion, the heat insulating container including a core material, an adsorbent, and two cover materials facing each other, the two cover materials covering the core material and the adsorbent; a heat insulating lid configured to close the heat insulating container; a protection case that covers outside of the heat insulating container and outside of the heat insulating lid; a box body housed inside the heat insulating container; a box lid configured to close the box body; and a phase change material provided on a bottom portion and a wall portion of the box body and the box lid. The cover materials are joined together at faces facing the heat insulating lid among faces constituting the wall portion of the heat insulating container. A joined part of the cover materials is located inside the protection case without being exposed to an outer surface of the protection case.

Accordingly, since the joined part of the cover materials is located inside the protection case without being exposed to the outer surface of the protection case, the heat insulating container does not make direct contact with outside air. Thus, it is possible to prevent heat from leaking through the surface of the heat insulating container and maintain a stored item at a predetermined temperature for a long time.

According to a second aspect of the invention, a clearance is formed between an outer side face of the heat insulating container and an inner side face of the protection case.

This enables air heat insulation between the heat insulating container and the protection case and makes heat from the heat insulating container less prone to being transferred to the protection case. Thus, it is possible to maintain the inside of the heat insulating container at a predetermined temperature for a long time.

According to a third aspect of the invention, the adsorbent is disposed on a bottom face of the heat insulating container.

Accordingly, since the bottom portion of the heat insulating container releases less heat than the upper portion thereof, the heat insulating effect can be maintained even when the adsorbent is disposed on the bottom face of the heat insulating container.

According to a fourth aspect of the invention, a height of the joined part of the cover materials of the heat insulating container is lower than a height of an opening of the protection case covering the heat insulating container.

Accordingly, since the joined part of the heat insulating container is covered by the outer side face of the protection case without being exposed to the outer surface of the protection case, heat from the inside of the heat insulating container hits the side wall of the protection case, which enables prevention of heat leakage.

According to a fifth aspect of the invention, the phase change material disposed on the bottom portion of the box body and the phase change material disposed on the wall portion of the box body are in contact with each other.

This makes it possible to reduce heat transfer from the outside of the box body, thereby maintaining a stored item at a predetermined temperature.

According to a sixth aspect of the invention, a mass of the phase change material provided on the box lid is larger than a mass of the phase change material provided on the bottom portion of the box body.

Accordingly, since the amount of heat entry from the closed portion constituted by the heat insulating container and the heat insulating lid is larger than the amount of heat entry from the bottom portion of the heat insulating container, heat release in the entire isothermal container can be reduced by making the volume of the phase change material of the box lid near the closed portion larger than the volume of the cold storage agent on the bottom portion of the box body.

According to a seventh aspect of the invention, the phase change material provided on the wall portion of the box body has a thickness larger in an upper part than in a lower part.

Accordingly, since the amount of heat entry from the closed portion constituted by the heat insulating container and the heat insulating lid is larger than the amount of heat entry from the bottom portion of the heat insulating container, heat release in the entire isothermal container can be reduced by making the thickness of the phase change material located on the wall portion of the box body larger in the upper part near the closed portion than in the lower part.

Hereinbelow, an embodiment of the present invention will be described with reference to the drawings.

Figure 2:
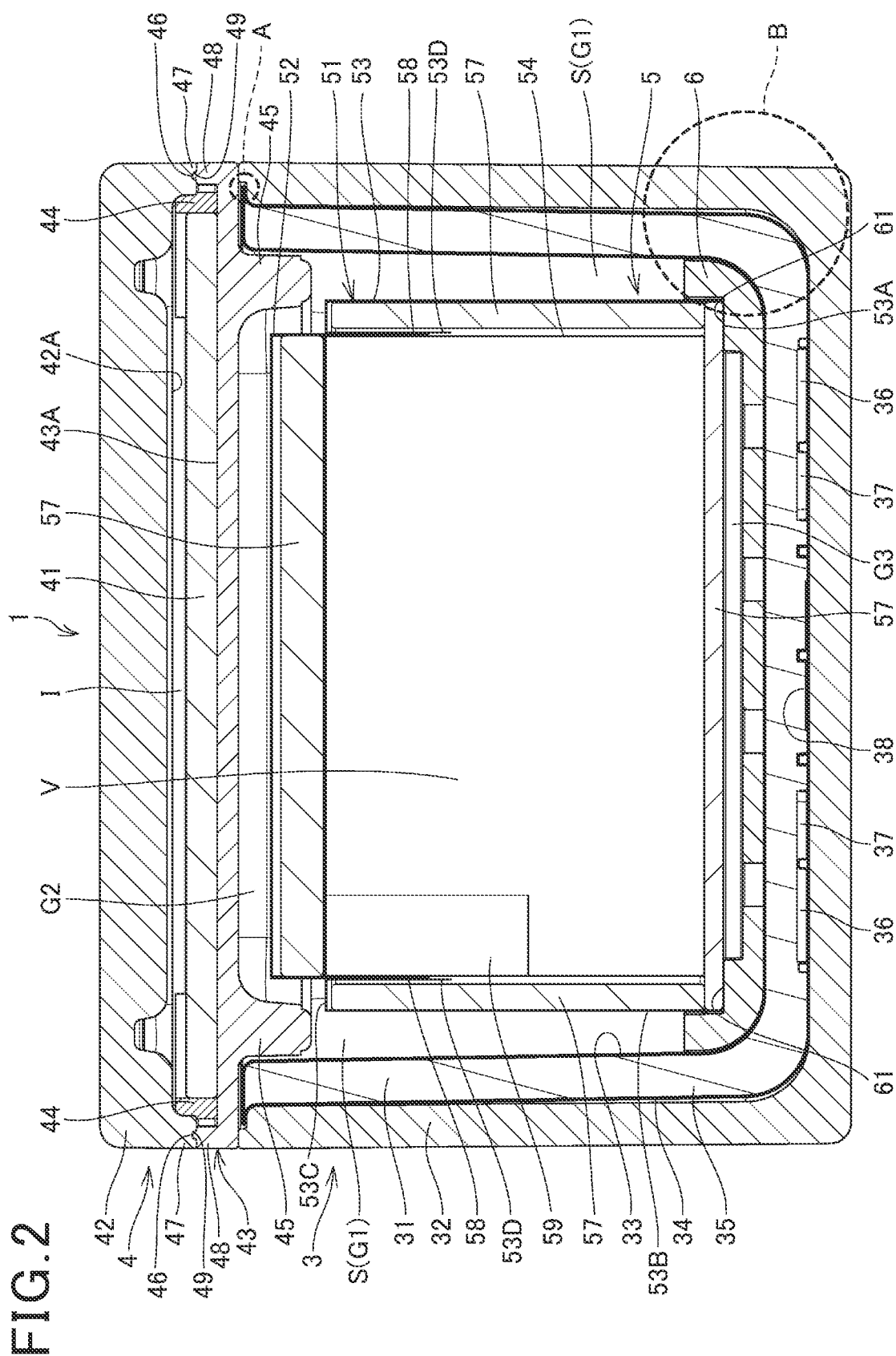
FIG. 2 is a vertical sectional view in a longitudinal direction of the isothermal container.
Figure 3:
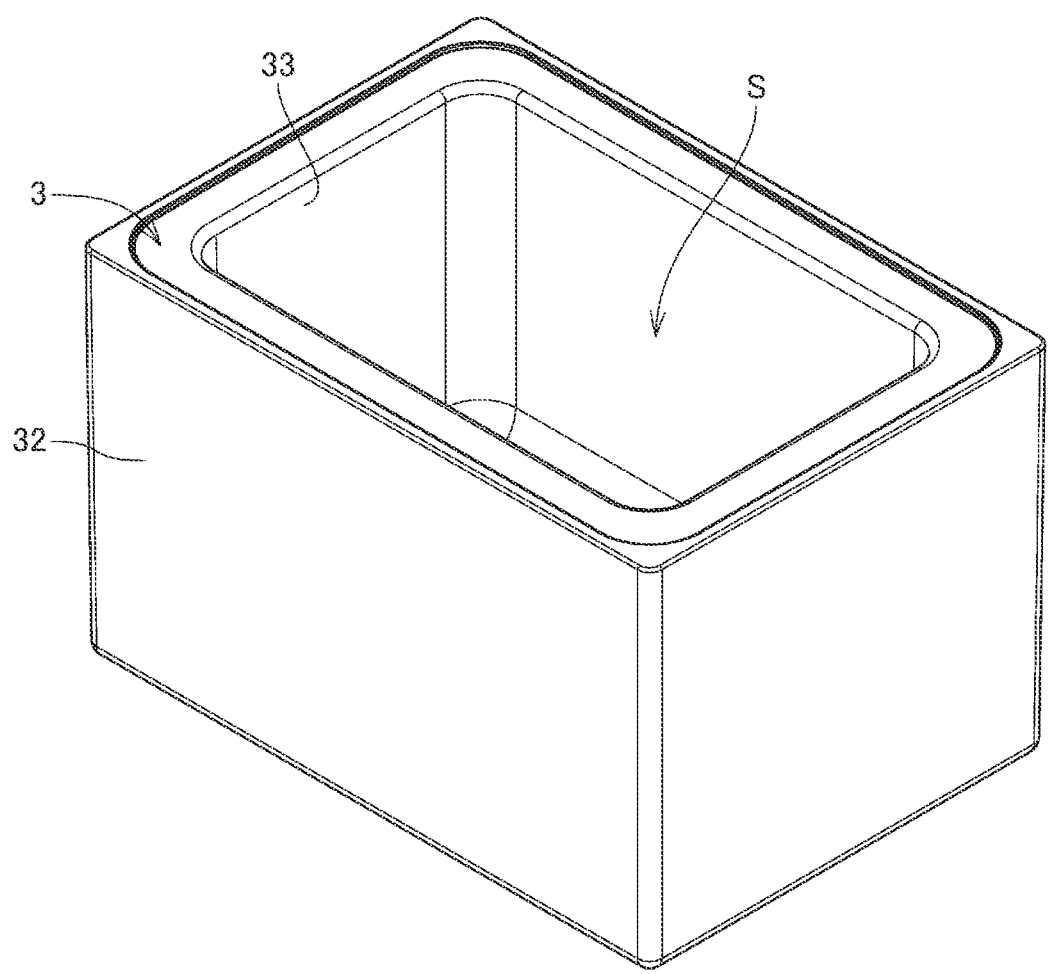
FIG. 3 is a perspective view of a vacuum heat insulating container.
Figure 4:
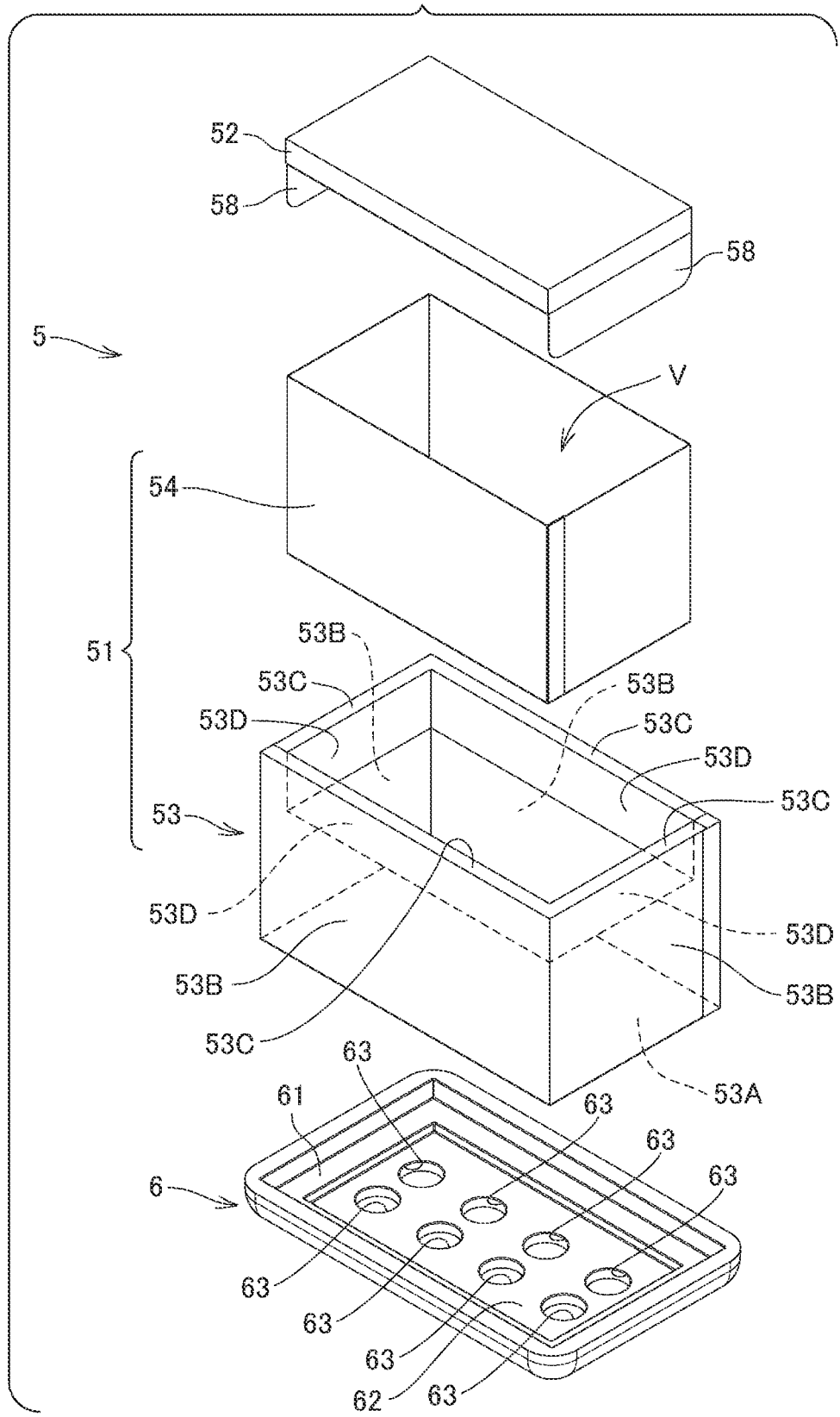
FIG. 4 is an exploded perspective view of a storage box and a support member.

FIG. 1 is an exploded perspective view of an isothermal container 1 according to the embodiment of the present invention. FIG. 2 is a vertical sectional view in a longitudinal direction of the isothermal container 1. FIG. 3 is a perspective view of a vacuum heat insulating container 3. FIG. 4 is an exploded perspective view of a storage box 5 and a support member 6.

In FIG. 1, the isothermal container 1 is housed in a container case 2.

As shown in FIGS. 1 and 2, the isothermal container 1 includes the vacuum heat insulating container 3, a vacuum heat insulating lid 4, and the storage box 5 which is housed in the vacuum heat insulating container 3. The isothermal container 1 is housed in the container case 2 when used.

As shown in FIG. 2, the vacuum heat insulating container 3 includes an outer cover material 34.

The outer cover material 34 is formed in a box shape with an open upper face, and an inner cover material 33 is disposed inside the outer cover material 34. The inner cover material 33 has a dimension that allows a predetermined clearance to be left from each side face and a bottom face of the outer cover material 34. A core material 35 is housed between the outer cover material 34 and the inner cover material 33.

The vacuum heat insulating container 3 having a vacuum heat insulating function is formed by sealing an outer peripheral edge between the outer cover material 34 and the inner cover material 33 under vacuum with the core material 35 disposed between the outer cover material 34 and the inner cover material 33.

In the present embodiment, flange portions 34a and 33a extending outward in a substantially horizontal direction are respectively formed on outer peripheral edges of the outer cover material 34 and the inner cover material 33 of the vacuum heat insulating container 3.

The flange portion 34a of the outer cover material 34 and the flange portion 33a of the inner cover material 33 are welded together to form the vacuum heat insulating container 3.

Although the outer cover material 34 and the inner cover material 33 are not limited to any particular material, the outer cover material 34 and the inner cover material 33 are molded of a resin material having an excellent gas barrier property. For example, a moldable resin, such as polypropylene or an ethylene-vinyl alcohol copolymer, is used.

Although the core material 35 is not limited to any particular material, the core material 35 is made of, for example, polyol or isocyanate. A material used as a core material of a vacuum heat insulating material, such as a molded article made of urethane foam having an open-cell structure or glass fiber or a molded article made of fumed silica, can be used.

As shown in FIG. 3, a housing space S is provided inside the vacuum heat insulating container 3.

A gas adsorbent 36, a water adsorbent 37, and a reinforcing plate 38 having a hole on its center are disposed between a bottom portion of the outer cover material 34 and the core material 35. Since the outer cover material 34 and the inner cover material 33 of the vacuum heat insulating container 3 are joined together at the flange portions 34a and 33a which are located at a position facing the vacuum heat insulating lid 4, the vacuum heat insulating container 3 releases less heat at the bottom portion (the portion far from the joined location) than at the upper portion. Thus, disposing the gas adsorbent 36, the water adsorbent 37, and the reinforcing plate 38 on the bottom face of the vacuum heat insulating container 3 does not interfere with a heat insulating effect.

An exhaust hole for evacuating the vacuum heat insulating container 3 is provided at a position corresponding to the hole of the reinforcing plate 38 of the outer cover material 34, and the exhaust hole is closed with a sealing material (not illustrated) after the evacuation of the vacuum heat insulating container 3. The reinforcing plate 38 can support the sealing material in closing the exhaust hole with the sealing material. A body protection case 32 is a housing that covers an outer surface of the vacuum heat insulating container 3. The body protection case 32 may be formed of a resin having a heat insulating property, such as styrene foam.

Figure 5:
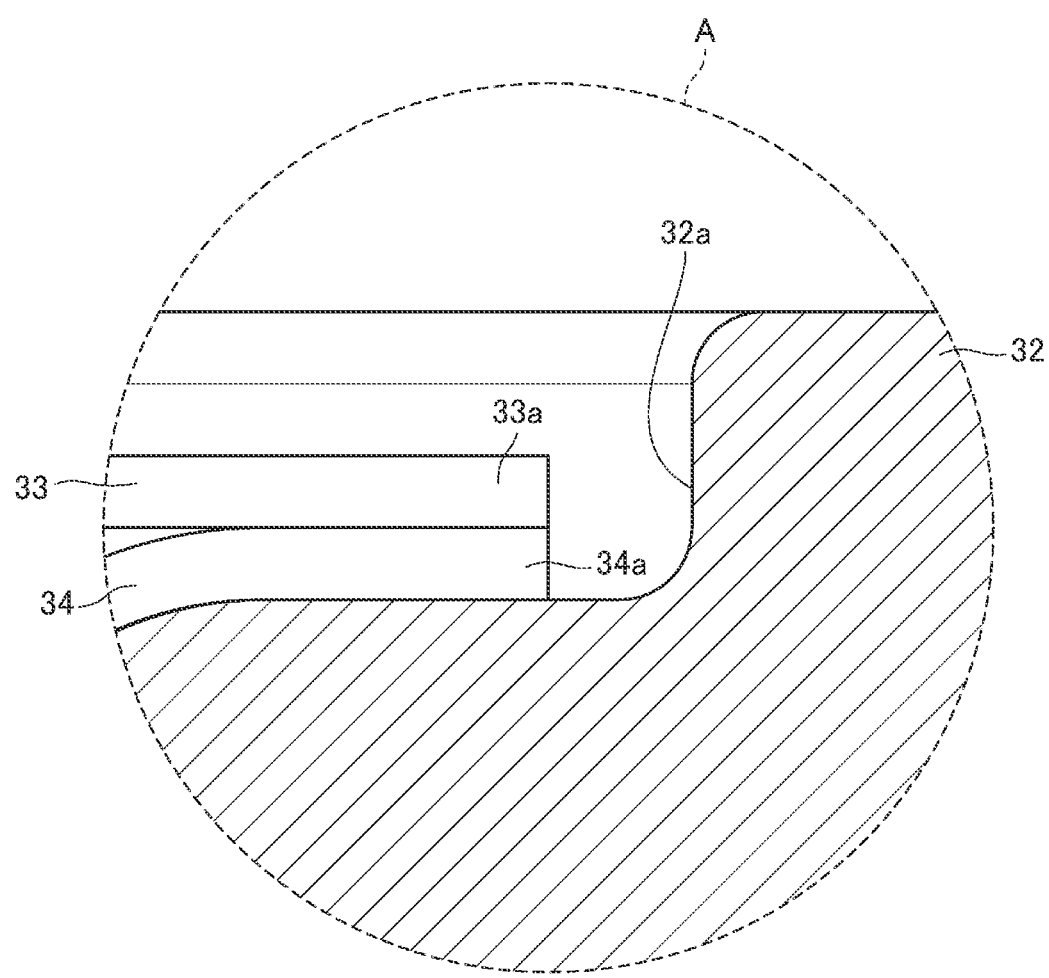
FIG. 5 is an enlarged view of an area enclosed by circle A in FIG. 2.

FIG. 5 is an enlarged view of an area enclosed by circle A in FIG. 2.

As shown in FIGS. 2 and 5, an inner peripheral side of an upper face of an outer peripheral portion of the body protection case 32 is recessed downward to form a support recess 32a. A height dimension of the support recess 32a is larger than a thickness dimension of the flange portions 34a and 33a of the vacuum heat insulating container 3.

That is, when the flange portions 34a and 33a of the vacuum heat insulating container 3 are placed on the support recess 32a of the body protection case 32, an outer side face of the support recess 32a projects above the flange portions 34a and 33a, and, in this state, the vacuum heat insulating container 3 is supported on the body protection case 32.

Accordingly, peripheral edges of the flange portions 34a and 33a are not exposed to an outer surface of the body protection case 32 and covered by the outer side face of the support recess 32a of the body protection case 32. Thus, heat from the inside of the vacuum heat insulating container 3 hits a side wall of the support recess 32a, which enables prevention of heat leakage.

Figure 6:
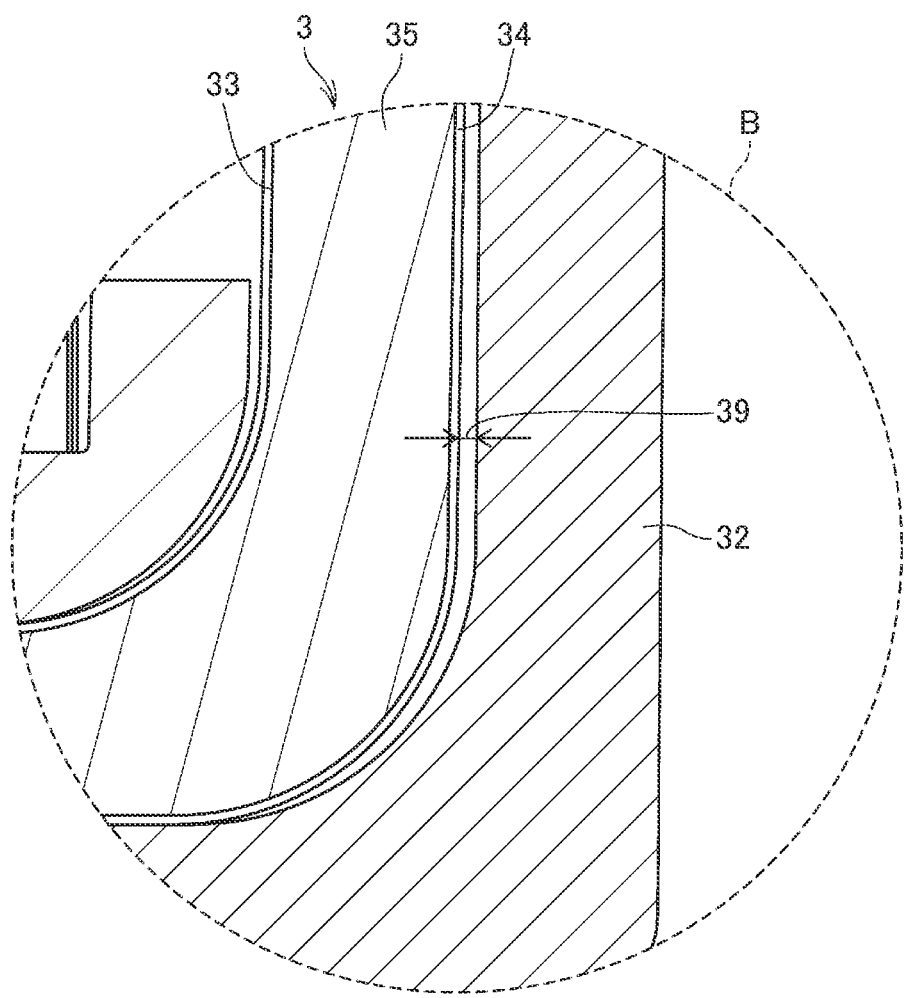
FIG. 6 is an enlarged view of an area enclosed by circle B in FIG. 2.

FIG. 6 is an enlarged view of an area enclosed by circle B in FIG. 2.

As shown in FIGS. 2 and 6, in the present embodiment, a tiny clearance 39 is formed between the outer surface of the vacuum heat insulating container 3 and an inner face of the body protection case 32.

The clearance 39 is provided for air heat insulation between the vacuum heat insulating container 3 and the body protection case 32.

This makes heat from the vacuum heat insulating container 3 less prone to being transferred to the body protection case 32. Thus, it is possible to maintain the inside of the vacuum heat insulating container 3 at a predetermined temperature for a long time.

The vacuum heat insulating lid 4 is a member that closes an opening of the vacuum heat insulating container 3.

As shown in FIG. 2, the vacuum heat insulating lid 4 includes a lid outer protection case 42 having an outer shape similar to the outer shape of the body protection case 32. An upper joint portion 47 extending downward is formed on a peripheral edge of a lower face of the lid outer protection case 42 over the entire circumference of the lid outer protection case 42. A joint recess 46 is formed on a lower face of the upper joint portion 47.

An outer housing portion 42A which is surrounded by the upper joint portion 47 and has a recessed shape is formed on the lower face of the lid outer protection case 42.

A lid inner protection case 43 is disposed under the lid outer protection case 42. A lower joint portion 48 extending upward is formed on a peripheral edge of an upper face of the lid inner protection case 43 over the entire circumference of the lid inner protection case 43. A joint projection 49 is formed on an upper face of the lower joint portion 48.

An inner housing portion 43A which is surrounded by the lower joint portion 48 and has a recessed shape is formed on the upper face of the lid inner protection case 43.

The lid outer protection case 42 and the lid inner protection case 43 are integrally formed by joining the joint recess 46 of the upper joint portion 47 and the joint projection 49 of the lower joint portion 48 to each other. In this state, a predetermined internal space I is defined by the outer housing portion 42A of the lid outer protection case 42 and the inner housing portion 43A of the lid inner protection case 43.

A vacuum heat insulating plate 41 is housed in the internal space I. In the present embodiment, fixing members 44 each having a substantially L shape are attached to four corners of the vacuum heat insulating plate 41. The vacuum heat insulating plate 41 can be fixed so as not to move inside the internal space I by the fixing members 44 abutting against the four corners of the internal space I in a state where the vacuum heat insulating plate 41 is housed in the internal space I.

The vacuum heat insulating plate 41 may be fixed to the lid outer protection case 42 and the lid inner protection case 43 by using not the fixing members 44 each having a substantially L shape, but, for example, a linear fixing member provided along each side of the vacuum heat insulating plate 41 or an adhesive.

Although, in the present embodiment, the vacuum heat insulating plate 41 is formed of the same material as the vacuum heat insulating container 3, for example, a vacuum heat insulating material including the core material 35 sealed inside a cover material made of a metal material such as aluminum may be used as the vacuum heat insulating plate 41.

In the present embodiment, the lid outer protection case 42 and the lid inner protection case 43 are formed of the same material as the body protection case 32.

A projecting portion 45 projecting downward is formed near an outer periphery of a lower face of the lid inner protection case 43. The projecting portion 45 is configured in such a manner that an outer side face of the projecting portion 45 abuts against an inner side face of the vacuum heat insulating container 3 in a state where the vacuum heat insulating lid 4 is attached to the vacuum heat insulating container 3 to close the upper face of the vacuum heat insulating container 3. Providing the projecting portion 45 in this manner makes it possible to set a long heat entry path between the vacuum heat insulating container 3 and the vacuum heat insulating lid 4, thereby improving the heat insulating performance of the isothermal container 1.

As shown in FIG. 4, the storage box 5 is removably housed in the housing space S of the vacuum heat insulating container 3. The storage box 5 includes a box body 51 and a box lid 52.

The box body 51 includes an outer box 53 having a box shape with an open upper face. The outer box 53 includes a bottom plate 53A having a rectangular shape and four side plates 53B which are provided in a standing manner on four sides of the bottom plate 53A. An upper plate 53C is formed on an upper end edge of each of the side plates 53B, the upper plate 53C extending inward of the outer box 53 with a predetermined width dimension. A folded-back plate 53D extending downward is integrally formed with an inner edge of each of the upper plates 53C. The folded-back plate 53D extends up to a position corresponding to a midway part of each side plate 53B.

An inner box 54 is housed inside the outer box 53. The inner box 54 has a box shape with an open upper face and is formed in such a manner as to abut against an inner face of the folded-back plate 53D.

The outer box 53 and the inner box 54 are both molded into a box shape by bending a sheet-like resin material having plasticity. Examples of the resin material include transparent polypropylene and ABS resin.

Cold storage agents 57 each having a flat-plate shape are stored between each side plate 53B and the corresponding folded-back plate 53D and on an upper face of the bottom plate 53A of the outer box 53. The cold storage agent 57 disposed on the bottom plate 53A is disposed over substantially the entire face of the bottom plate 53A, and a lower end of the cold storage agent 57 disposed on each side plate 53B is in contact with the cold storage agent 57 disposed on the bottom plate 53A.

That is, the cold storage agents 57 are disposed on the bottom portion and the wall portion of the box body 51 with no thermal gap therebetween. This makes it possible to reduce heat transfer from the outside of the storage box 5, thereby maintaining the inside of the storage box 5 within a predetermined temperature range.

The cold storage agents 57 disposed on the bottom portion and the wall portion of the box body 51 may be integrated with each other.

Since each folded-back plate 53D is formed up to the position corresponding to the midway part of the corresponding side plate 53B, it is easy to store the cold storage agent 57 between each side plate 53B and the corresponding folded-back plate 53D.

Each cold storage agent 57 is held between the outer box 53 and the inner box 54 by storing the inner box 54 inside the outer box 53 after storing the cold storage agent 57. That is, the box body 51 supports each cold storage agent 57 by sandwiching the cold storage agent 57 from both sides. This makes it possible to reliably support and fix each cold storage agent 57 having a plate shape and prevent the cold storage agents 57 from separating from each other during conveyance of the isothermal container 1.

A storage space V is provided inside the box body 51, that is, inside the inner box 54.

The box lid 52 is a member that closes an opening of the box body 51 to constitute a top face of the storage box 5. The box lid 52 is formed in a thin box shape by bending the same resin material as the box body 51, and the outer shape of the box lid 52 is substantially the same as the shape of the upper opening of the box body 51.

The box lid 52 of the present embodiment is detachably attached to the box body 51. This makes it possible to prevent the storage box 5 from being cooled in a closed state in cooling the storage box 5.

Insertion portions 58 each of which extends downward and has a plate shape (flap shape) are formed on respective lower edges of the box lid 52, the lower edges being located on the opposite sides in the longitudinal direction. Each of the insertion portions 58 has the same width dimension as the box lid 52.

In closing the upper opening of the box body 51 with the box lid 52, each insertion portion 58 is inserted between the corresponding folded-back plate 53D and the inner box 54 to fix the box lid 52.

Since the box lid 52 has substantially the same shape as the upper opening of the box body 51 and the width dimension of the insertion portions 58 is the same as the width dimension of the box lid 52, each of the insertion portions 58 inserted between the folded-back plate 53D and the inner box 54 is located on the width of the upper opening of the box body 51, which enables appropriate positioning of the box lid 52 on the box body 51.

The cold storage agent 57 is stored inside the box lid 52. A thickness dimension of the cold storage agent 57 stored inside the box lid 52 may be larger than a thickness dimension of each cold storage agent 57 stored on the bottom portion of the box body 51.

The cold storage agent provided on the wall portion of the box body 51 may be formed in a tapered shape so as to be thicker in the upper part and thinner in the lower part.

Accordingly, since the bottom portion of the box body 51 releases less heat than the wall portion of the box body 51 and the box lid 52, it is possible to reduce heat release even when the volume of the cold storage agent on the bottom portion of the box body 51 is reduced or the thickness in the lower part of the cold storage agent provided on the wall portion of the box body 51 is made smaller than the thickness in the upper part thereof.

The cold storage agents 57 maintain the inside of the storage box 5 at a temperature lower than room temperature, for example, at approximately 2 to 8° C. Each of the cold storage agents 57 of the present embodiment includes a phase change material capable of using transition heat caused by phase change or phase transition of a substance, and stores such transition heat as heat energy and is used as a latent heat storage material. The cold storage agent 57 is formed by covering the phase change material with a resin cover.

When the cold storage agent 57 is cooled, the phase change material undergoes a phase change from liquid or gel to solid. On the other hand, when the cold storage agent 57 absorbs heat to increase its temperature, the phase change material undergoes a phase change from solid to liquid or gel. That is, the cold storage agent 57 is brought into a state where cold heat is stored through the phase change of the phase change material to solid, which enables the cold storage agent 57 to absorb heat.

A phase change material obtained by appropriately mixing an additive to various paraffins to adjust a freezing point or a melting point where a phase change occurs to a predetermined temperature is used as the phase change material of the cold storage agent 57 of the present embodiment.

As described above, the cold storage agents 57 of the present embodiment are a plurality of plate-like members. Accordingly, in cooling each cold storage agent 57, it is possible to remove the cold storage agent 57 from the storage box 5 and cools only the cold storage agent 57 in, for example, a cooling chamber. Thus, it is possible to cool each cold storage agent 57 in a shorter time and also reduce a space occupied by the cold storage agents 57 inside the cooling chamber during cooling by, for example, stacking the cold storage agents 57 on each other.

A logger case 59 in which a data logger including various sensors is housed is provided on a corner inside the storage box 5.

The support member 6 is housed inside the vacuum heat insulating container 3 and located on the bottom portion thereof.

The support member 6 is formed in a substantially flat-plate shape, and a support recess 61 having substantially the same shape as the outer shape of the storage box 5 is formed on an upper face of the support member 6.

Further, a clearance recess 62 having a rectangular shape smaller than the outer shape of the storage box 5 is formed on an upper face of the support recess 61.

Further, the clearance recess 62 includes a plurality of through holes 63. The through holes 63 of the present embodiment are provided in number and arrangement that enable reduction of the strength of the support member 6 to be prevented.

The support member 6 is formed of, for example, a heat insulating material such as styrene foam.

The storage box 5 is housed, and supported and fixed inside the vacuum heat insulating container 3 by being placed on the support recess 61 of the support member 6. In this state, an outer side face of the storage box 5 is disposed with a predetermined clearance G1 left from the inner side face of the vacuum heat insulating container 3. Similarly, the box lid 52 is disposed with a predetermined clearance G2 left from the lower face of the vacuum heat insulating lid 4 and the projecting portion 45.

Further, a clearance G3 is provided between the bottom plate 53A of the storage box 5 and the clearance recess 62.

The isothermal container 1 is housed in the container case 2 so as to be easily conveyed in conveying a stored item. The container case 2 includes a case body 22 having a box shape with an open upper face and a case lid 21 which is coupled to one side edge of an upper portion of the case body 22.

The case lid 21 and the case body 22 can be closed with a case fastener 23. A handle 24 is attached to the case fastener 23 to open and close the case fastener 23.

A plurality of case lid fixtures 25 are provided on a front face of the case body 22. A plurality of fixing belts provided on a top face of the case lid 21 are coupled to the case lid fixtures 25 so that the container case 2 and the isothermal container 1 can be more reliably maintained in a closed state.

Handles 26 are provided on respective side faces of the container case 2, and a conveyance belt 27 is coupled to the side faces. The handles 26 and the conveyance belt 27 enable easy conveyance of the container case 2 and the isothermal container 1.

A plurality of document storage portions 28 are provided on the front face of the container case 2.

Next, the action of the present embodiment will be described.

The isothermal container 1 of the present embodiment is used in delivering a stored item such as an investigational drug while maintaining and managing the stored item at a temperature within a predetermined temperature range. The stored item is stored in the storage space V of the storage box 5. The stored item is maintained and managed within the predetermined temperature range by using a double structure of the storage box 5 including the cold storage agents 57 and the vacuum heat insulating container 3.

The isothermal container 1 maintains the storage space V of the storage box 5 at the temperature within the predetermined temperature range by using the cooled cold storage agents 57. The cold storage agents 57 may be cooled by removing the cold storage agents 57 from the storage box 5 and storing the removed cold storage agents 57 in the cooling chamber. Alternatively, the cold storage agents 57 stored in the storage box 5 may be stored in the cooling chamber. Similarly, the vacuum heat insulating lid 4 and the box lid 52 may be opened, and the storage box 5 stored in the vacuum heat insulating container 3 may be stored in the cooling chamber.

As described above, when the flange portions 34a and 33a of the vacuum heat insulating container 3 are placed on the support recess 32a of the body protection case 32, the outer side face of the support recess 32a projects above the flange portions 34a and 33a. Thus, the peripheral edges of the flange portions 34a and 33a are not exposed to the outer surface of the body protection case 32 and covered by the outer side face of the support recess 32a of the body protection case 32. Accordingly, heat from the inside of the vacuum heat insulating container 3 hits the side wall of the support recess 32a, which enables prevention of heat leakage.

Since the tiny clearance 39 is formed between the outer surface of the vacuum heat insulating container 3 and the inner face of the body protection case 32, heat from the vacuum heat insulating container 3 is less prone to being transferred to the body protection case 32, and the inside of the vacuum heat insulating container 3 can be maintained at the predetermined temperature for a long time.

As described above, in the present embodiment, the isothermal container includes: the vacuum heat insulating container 3 (heat insulating container) having the bottom portion and the wall portion continuous with the peripheral edge of the bottom portion, the heat insulating container 3 including the core material 35, the gas adsorbent 36 and the water adsorbent 37 (adsorbent), and the outer cover material 34 and the inner cover material 33 (two cover materials) facing each other, the outer cover material 34 and the inner cover material 33 covering the core material 35, and the gas adsorbent 36 and the water adsorbent 37; the vacuum heat insulating lid 4 (heat insulating lid) which closes the vacuum heat insulating container 3; the body protection case 32, the lid outer protection case 42, and the lid inner protection case 43 (protection case) which cover the outside of the vacuum heat insulating container 3 and the outside of the vacuum heat insulating lid 4; the box body 51 housed inside the vacuum heat insulating container 3; the box lid 52 which closes the box body 51; and the cold storage agents (phase change materials) provided on the bottom portion and the wall portion of the box body 51 and the box lid 52. The outer cover material 34 and the inner cover material 33 are joined together at the faces facing the vacuum heat insulating lid 4 among the faces constituting the wall portion of the vacuum heat insulating container 3. The joined part of the outer cover material 34 and the inner cover material 33 is located inside the body protection case 32 without being exposed to the outer surface of the body protection case 32.

Accordingly, since the joined part of the outer cover material 34 and the inner cover material 33 is located inside the body protection case 32 without being exposed to the outer surface of the body protection case 32, the vacuum heat insulating container 3 does not make direct contact with outside air. Thus, it is possible to prevent heat from leaking through the surface of the vacuum heat insulating container 3 and maintain a stored item at a predetermined temperature for a long time.

According to the present embodiment, the clearance 39 is formed between the outer side face of the vacuum heat insulating container 3 and the inner side face of the body protection case 32.

This enables air heat insulation between the vacuum heat insulating container 3 and the body protection case 32 and makes heat from the vacuum heat insulating container 3 less prone to being transferred to the body protection case 32. Thus, it is possible to maintain the inside of the vacuum heat insulating container 3 at a predetermined temperature for a long time.

According to the present embodiment, the adsorbent is disposed on the bottom face of the vacuum heat insulating container 3.

Accordingly, since the bottom portion of the vacuum heat insulating container 3 releases less heat than the upper portion thereof, the heat insulating effect can be maintained even when the gas adsorbent 36 and the water adsorbent 37 (adsorbent) are disposed on the bottom face of the vacuum heat insulating container 3.

According to the present embodiment, the height of the joined part of the outer cover material 34 and the inner cover material 33 of the vacuum heat insulating container 3 is lower than the height of the opening of the body protection case 32 which covers the vacuum heat insulating container 3.

Accordingly, since the joined part of the vacuum heat insulating container 3 is covered by the outer side face of the body protection case 32 without being exposed to the outer surface of the body protection case 32, heat from the inside of the vacuum heat insulating container 3 hits the side wall of the support recess 32a, which enables prevention of heat leakage.

According to the present embodiment, the cold storage agents are disposed on the bottom portion and the wall portion of the box body 51 with no thermal gap therebetween.

This makes it possible to reduce heat transfer from the outside of the storage box 5, thereby maintaining a stored item at a predetermined temperature.

According to the present embodiment, the mass of the cold storage agent provided on the box lid 52 is larger than the mass of the cold storage agent provided on the bottom portion of the box body 51.

Accordingly, since the bottom portion of the box body 51 releases less heat than the wall portion of the box body 51 and the box lid 52, it is possible to reduce heat release even when the volume of the cold storage agent on the bottom portion of the box body 51 is reduced.

According to the present embodiment, the cold storage agent provided on the wall portion of the box body 51 has a thickness larger in the upper part than in the lower part.

Accordingly, since the bottom portion of the box body 51 releases less heat than the wall portion of the box body 51 and the box lid 52, it is possible to reduce heat release even when the cold storage agent provided on the wall portion of the box body 51 has a thickness smaller in the lower part than in the upper part.

The above embodiment merely describes, as an example, an aspect of the present invention, and any modifications and applications can be made without departing from the gist of the present invention.

INDUSTRIAL APPLICABILITY

The present invention has a configuration having an improved heat insulating property and is thus widely applicable to a use that requires keeping warm or cold and a use that requires maintenance and management within a specific temperature range such as a use for storing and conveying an investigational drug, blood, or a sample.

REFERENCE SIGNS LIST 1 isothermal container
2 container case
3 vacuum heat insulating container
4 vacuum heat insulating lid
5 storage box
6 support member
21 case lid
22 case body
32 body protection case
32a support recess
33 inner cover material
33a, 34a flange portion
34 outer cover material
35 core material
36 gas adsorbent
37 water adsorbent
39 clearance
41 vacuum heat insulating plate
42 lid outer protection case
43 lid inner protection case
51 box body
52 box lid
53 outer box
54 inner box
57 cold storage agent

The invention claimed is:

1. An isothermal container comprising:
a heat insulating container including i) an outer cover material formed in a box shape having side faces and a bottom face with an open upper face, ii) an inner cover material disposed inside the outer cover material, iii) a core material disposed between the outer cover material and the inner cover material, and iv) an adsorbent disposed between the outer cover material and the inner cover material, the outer cover material and the inner cover material facing each other, the hear insulating container including a housing space inside the heat insulating container;
a heat insulating lid configured to close the heat insulating container;
a protection case that covers outside of the heat insulating container and outside of the heat insulating lid;
a box body housed in the housing space inside the heat insulating container;
a box lid configured to close the box body; and
a phase change material provided on a bottom portion and a wall portion of the box body and the box lid, wherein
the inner cover material has a first flange portion on an outer peripheral edge of the inner cover material such that the first flange portion extends outward away from the housing space and beyond the respective side faces of the outer cover material,
the outer cover material has a second flange portion on an outer peripheral edge of the inner cover material such that the second flange extends outward away from the housing space and beyond the respective side faces of the outer cover material,
the first flange portion of the inner cover material and the second flange portion of the outer cover material join each other such that the first flange portion of the inner cover material overlaps the second flange portion of the outer cover material in plan view, and
the heat insulating lid overlaps a joined part of the first flange portion and the second flange portion in plan view such that the heat insulating lid, the first flange portion, and the second flange portion are arranged in the mentioned order from a heat insulating lid side toward a heat insulating container side.

2. The isothermal container according to claim 1, wherein a clearance is formed between an outer side face of the heat insulating container and an inner side face of the protection case.

3. The isothermal container according to claim 1, wherein the adsorbent is disposed on a bottom face of the heat insulating container.

4. The isothermal container according to claim 1, wherein a height of the joined part of the first and second flange portions is lower than a height of an opening of the protection case covering the heat insulating container.

5. The isothermal container according to claim 1, wherein the phase change material disposed on the bottom portion of the box body and the phase change material disposed on the wall portion of the box body are in contact with each other.

6. The isothermal container according to claim 1, wherein a mass of the phase change material provided on the box lid is larger than a mass of the phase change material provided on the bottom portion of the box body.

7. The isothermal container according to claim 1, wherein the phase change material provided on the wall portion of the box body has a thickness larger in an upper part than in a lower part.

8. The isothermal container according to claim 1,
wherein a lower face of the second flange portion of the outer cover material abuts against an upper face of the protection case,
wherein a clearance is provided between an upper face of the first flange portion of the inner cover material and a lower face of the box lid, and
wherein the joined part of the first and second flange portions are formed by facing a lower face of the first flange portion of the inner cover material and an upper face of the second flange portion of the outer cover material to each other.

9. The isothermal container according to claim 8, wherein a support recess is provided to the protection case at a location facing the heat insulating lid, and the first and second flange portions of the heat insulating container are placed on the support recess.

10. The isothermal container according to claim 9, wherein a clearance is formed between peripheral edges of each of the first and second flange portions of the heat insulating container and an inner side face of the support recess.

11. The isothermal container according to claim 1, wherein the joined part of the first and second flange portions are located inside the protection case without being exposed to an outer surface of the protection case.

\* \* \* \* \*